(12) United States Patent
Phillips et al.

(10) Patent No.: US 10,248,945 B2
(45) Date of Patent: Apr. 2, 2019

(54) DYNAMIC SCREEN LOGO THAT TRANSMITS SHOPPING BASKET CONNECTION INFORMATION TO MOBILE DEVICE

(71) Applicant: MasterCard International Incorporated, Purchase, NY (US)

(72) Inventors: Simon Phillips, York (GB); Alan Johnson, Essex (GB)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 15/651,226

(22) Filed: Jul. 17, 2017

(65) Prior Publication Data

US 2018/0018655 A1  Jan. 18, 2018

Related U.S. Application Data

(60) Provisional application No. 62/363,525, filed on Jul. 18, 2016.

(51) Int. Cl.
*G06Q 20/32* (2012.01)
*G06Q 20/02* (2012.01)
*G06Q 20/20* (2012.01)
*G06Q 30/06* (2012.01)

(52) U.S. Cl.
CPC ....... *G06Q 20/3221* (2013.01); *G06Q 20/027* (2013.01); *G06Q 20/208* (2013.01); *G06Q 20/3223* (2013.01); *G06Q 20/3276* (2013.01); *G06Q 30/0607* (2013.01); *G06K 2209/01* (2013.01)

(58) Field of Classification Search
None
See application file for complete search history.

(56) References Cited

U.S. PATENT DOCUMENTS

| 7,634,448 B1 | 12/2009 | Ramachandran |
| 2013/0026220 A1 | 1/2013 | Whelihan |
| 2014/0101036 A1 | 4/2014 | Phillips et al. |
| 2016/0155112 A1 | 6/2016 | Phillips et al. |

FOREIGN PATENT DOCUMENTS

WO    2015/028339 A1    3/2015

OTHER PUBLICATIONS

"Notification of Transmittal of the International Search Report and the Written Opinion" International Searching Authority, or the Declaration, dated Oct. 6, 2017 (Oct. 6, 2017), for International Application No. PCT/US2017/042441, 12pgs.

*Primary Examiner* — Kristy A Haupt
(74) *Attorney, Agent, or Firm* — Buckley, Maschoff & Talwalkar LLC

(57) ABSTRACT

A design element is displayed on a display screen. The design element is modulated over time to encode data in the design element. The design element is presented by a merchant. A camera component of a mobile device is used to capture images over time of the design element. A payment application in the mobile device analyzes the captured images to obtain the encoded data. The payment application uses the encoded data to establish a communication channel with a merchant device operated by the merchant. As a result of communication over the communication channel, a purchase transaction is implemented, including transmission of payment credentials to the merchant from the payment application.

16 Claims, 9 Drawing Sheets

DYNAMIC SCREEN LOGO THAT TRANSMITS SHOPPING BASKET CONNECTION INFORMATION TO MOBILE DEVICE

CROSS REFERENCE TO RELATED APPLICATION

This application claims the benefit of U.S. Provisional Patent Application No. 62/363,525 (filed on Jul. 18, 2016); the contents of which provisional application are hereby incorporated by reference for all purposes.

BACKGROUND

FIG. 1 is a block diagram that illustrates a conventional payment system 100.

The system 100 includes a conventional payment card/device 102. As is familiar to those who are skilled in the art, the payment card/device 102 may be a magnetic stripe card, an IC (integrated circuit) card, a fob, a payment-enabled smartphone, etc. The payment card/device 102 is shown being carried and used by an account holder/user 103.

The system 100 further includes a reader component 104 associated with a POS terminal 106. In some known manner (depending on the type of the payment card/device 102) the reader component 104 is capable of reading the payment account number and other information from the payment card/device 102.

The reader component 104 and the POS terminal 106 may be located at the premises of a retail store and operated by a sales associate of the retailer for the purpose of processing retail transactions. The payment card/device 102 is shown in FIG. 1 to be interacting with the reader component 104 and the POS terminal 106 for the purpose of executing such a transaction.

A computer 108 operated by an acquirer (acquiring financial institution) is also shown as part of the system 100 in FIG. 1. The acquirer computer 108 may operate in a conventional manner to receive an authorization request for the transaction from the POS terminal 106. The acquirer computer 108 may route the authorization request via a payment network 110 to the server computer 112 operated by the issuer of a payment account that is associated with the payment card/device 102. As is also well known, the authorization response generated by the payment card issuer server computer 112 may be routed back to the POS terminal 106 via the payment network 110 and the acquirer computer 108.

One well known example of a payment network is referred to as the "Banknet" system, and is operated by Mastercard International Incorporated, which is the assignee hereof.

The payment account issuer server computer 112 may be operated by or on behalf of a financial institution ("FI") that issues payment accounts to individual users. For example, the payment account issuer server computer 112 may perform such functions as (a) receiving and responding to requests for authorization of payment account transactions to be charged to payment accounts issued by the FI; (b) tracking and storing transactions and maintaining account records; (c) rendering periodic account statements; and (d) receiving and tracking payments to the issuer from the account holders.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their POS terminals and associated reader components. The system may also include a very large number of payment account holders, who carry payment cards or other devices for initiating payment transactions by presenting an associated payment account number to the reader component of a POS terminal.

Still further, and as is well-known, for e-commerce transactions, an e-commerce server computer (not shown) may function as the POS terminal. The e-commerce server computer may be operated by or on behalf of a merchant and may be accessed by the account holder via a browser program running on (for example) a personal computer (not shown) or a smartphone (not shown apart from payment device 102). To arrange for the payment portion of the e-commerce transaction, the account holder may manually enter a payment account number, or authorize a charge from a payment account number held on file by the merchant, or access a digital wallet, etc.

In earlier patent applications having a common inventor with this application, various techniques have been disclosed in which payment transactions may be initiated by using a suitably programmed smartphone to scan a QR code or other type of barcode. These earlier applications have been assigned U.S. Patent and Trademark Office application Ser. No. 14/050,974 ("the '974 application") and Ser. No. 14/980,968 (the "'968 application") and have been published as U.S. patent publication nos. 2014-0101036 and 2016-0155112. These earlier applications are incorporated herein by reference.

The present inventors have now recognized that there are opportunities to increase convenience and user-appeal in connection with payment transactions in which payment credentials are stored in or accessed via a suitably programmed mobile device such as a smartphone.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and example embodiments and which are not necessarily drawn to scale, wherein.

DESCRIPTION

In general, and for the purpose of introducing concepts of embodiments of the present disclosure, a mobile device that runs a payment application may scan a design element/brand logo in a screen display provided at the point of sale or by an e-commerce website page downloaded to the user's PC/laptop computer. The design element/brand logo may be dynamic/animated and may be modulated over time to present encoded data. The mobile device may capture the encoded data by capturing and analyzing a sequence of images of the modulated design element/brand logo. Using the encoded data, the mobile device may initiate communications and/or a payment phase of a transaction with the merchant's device/e-commerce computer.

Figure 2:
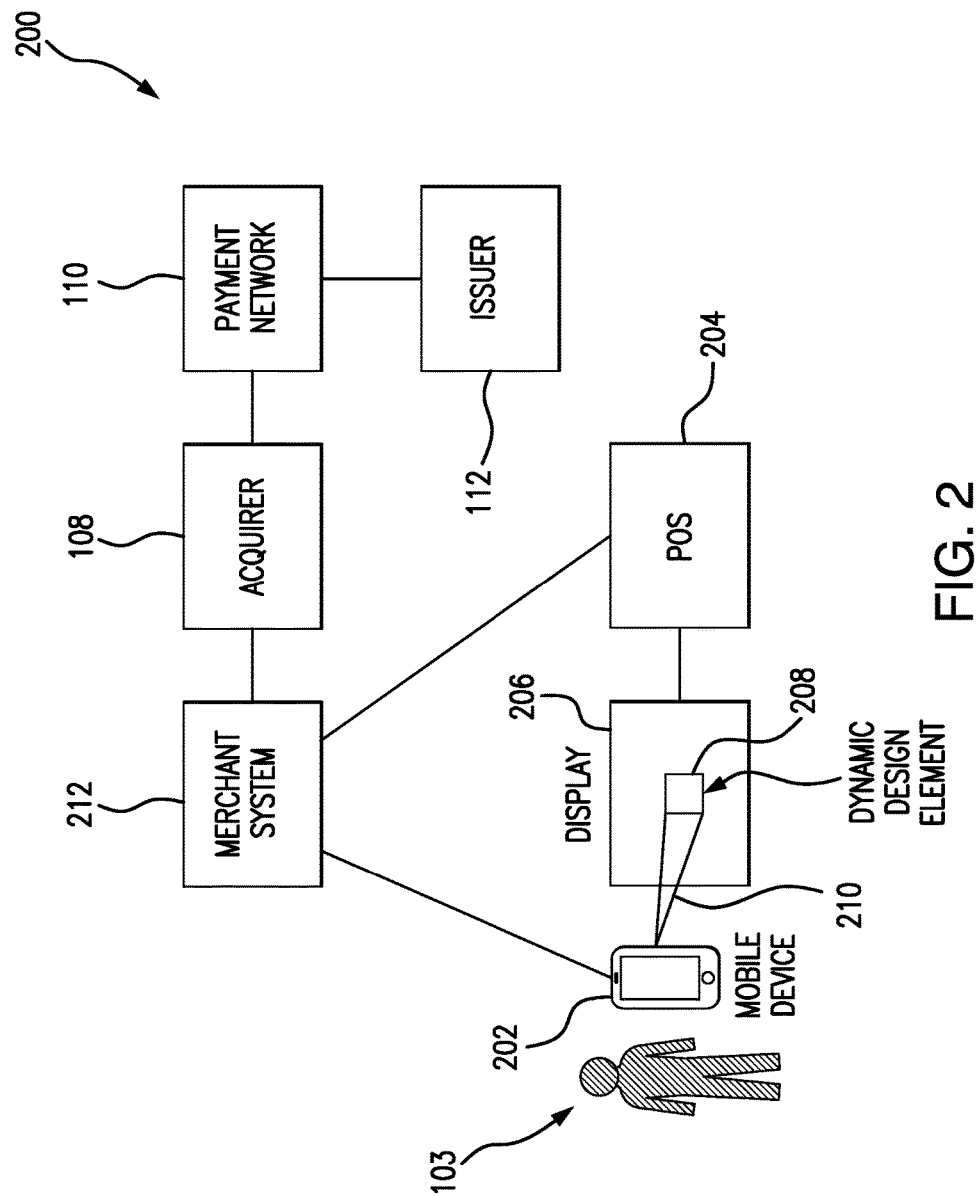
FIG. 2 is a block diagram that illustrates an embodiment of a payment system provided according to aspects of the present disclosure.

FIG. 2 is a block diagram that illustrates an embodiment of a payment system 200 provided according to aspects of the present disclosure.

FIG. 2 shows a user 103 operating a mobile device 202 (e.g., a suitably programmed smartphone) which performs payment functions in connection with the payment system 200. The user 103 and the mobile device 202 are present at a point of sale, which is not separately indicated apart from a POS device 204 and a display device 206 present at the point of sale (which may be a checkout counter in a retail store). The display device 206 displays a display image, which is not indicated in the drawing apart from a dynamic design element 208 that is part of the display image. As indicated at 210, the mobile device 202 scans the dynamic design element 208 (also known as the designated image element) via a camera component (not separately indicated in FIG. 2) that is part of the mobile device 202.

Block 212 in FIG. 2 represents a merchant device that the mobile device 202 may contact in response to data obtained by the mobile device 202 by scanning the dynamic design element 208. The contact from the mobile device 202 may open a communication channel with the merchant device 212. The communication channel may be via short-range communication (e.g., via Wi-Fi) or longer-range communication (e.g., via a mobile telecommunication network (not shown) and/or via the internet).

In some embodiments, the merchant device 212 may at least partially overlap with the POS device 204.

Figure 1:
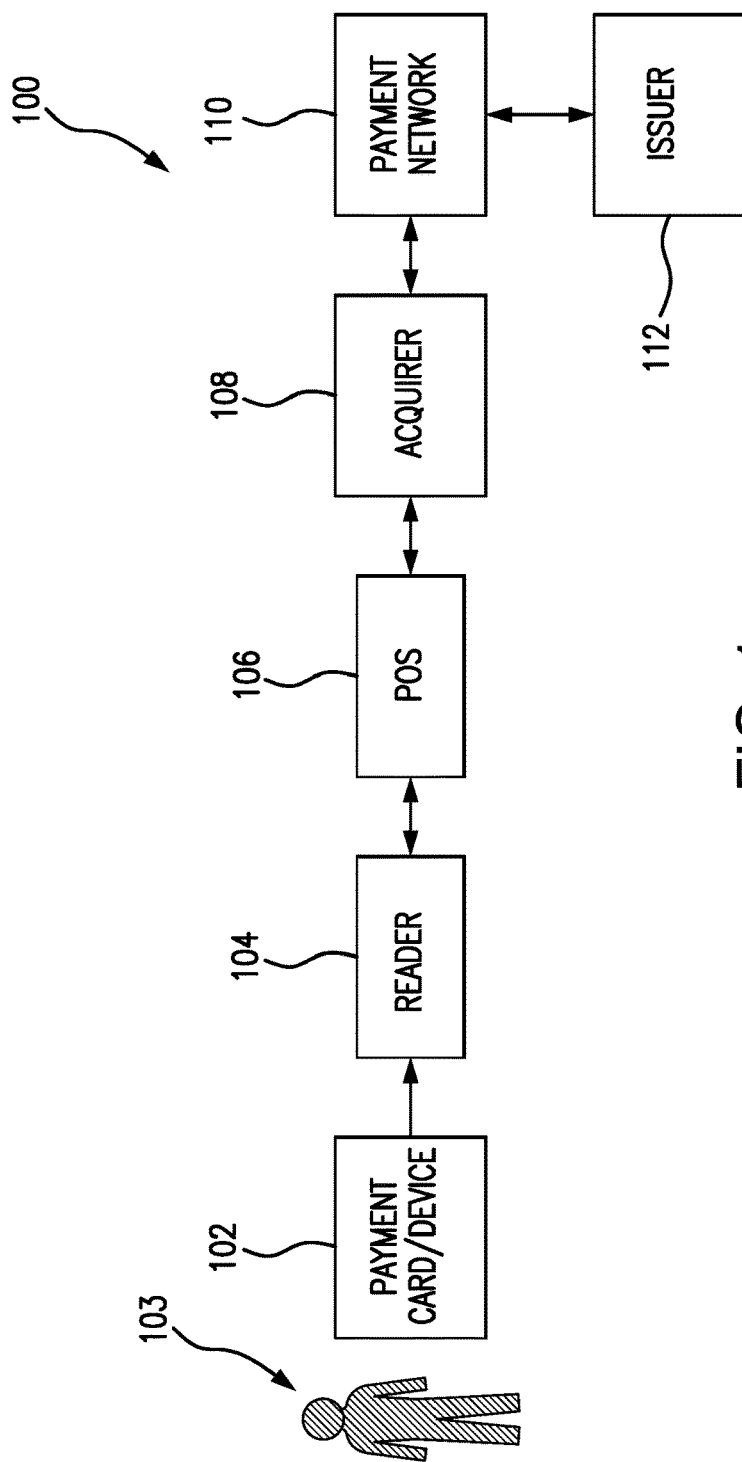
FIG. 1 is a block diagram that illustrates a conventional payment system.

The system 200 may further include the acquirer computer 108, payment network 110 and issuer computer 112, as referred to above in connection with FIG. 1. The latter three elements may provide essentially the same functionality as in the conventional payment system 100 described above in connection with FIG. 1.

Figure 3:
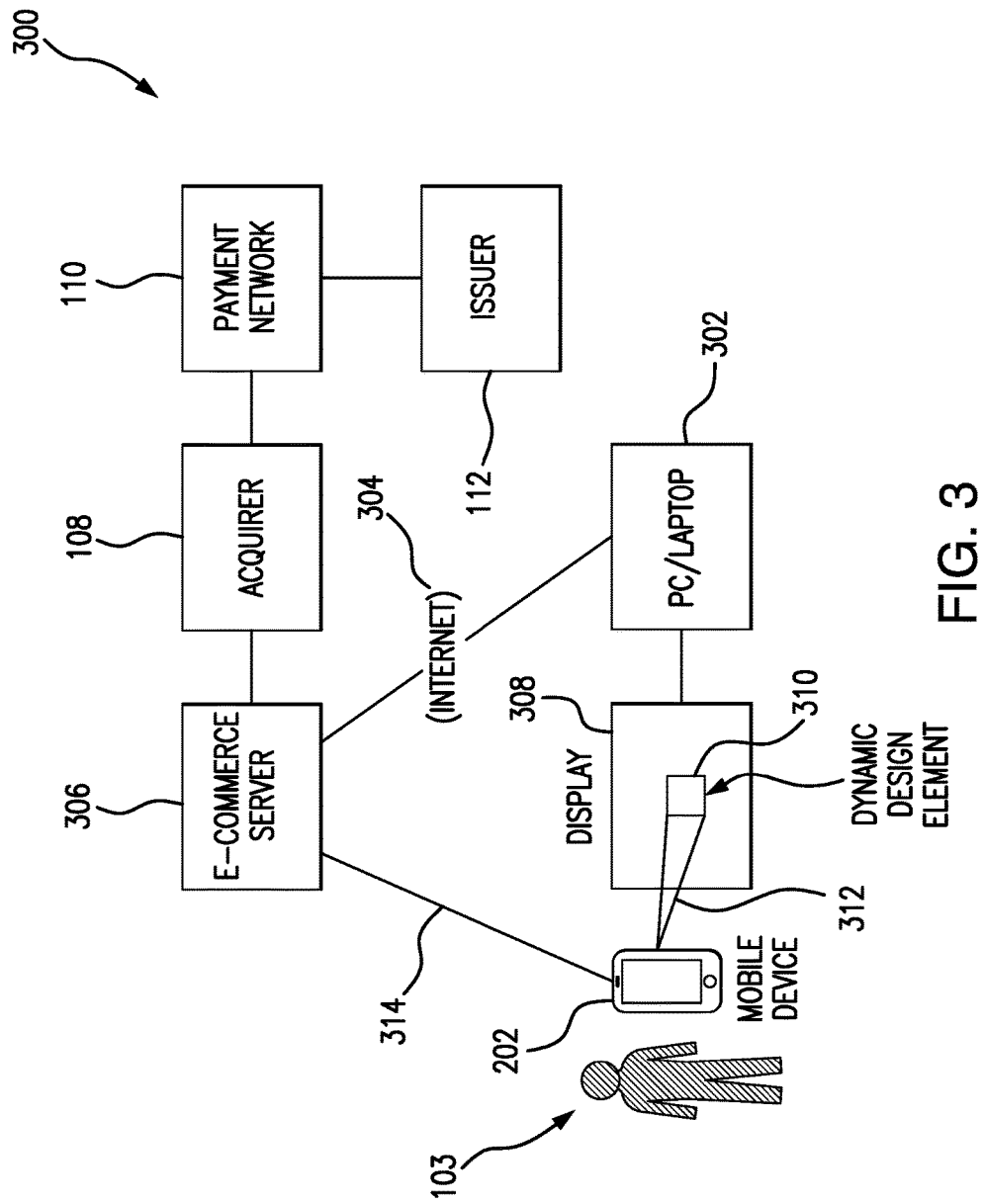
FIG. 3 is a block diagram that illustrates another embodiment of a payment system provided according to aspects of the present disclosure.

FIG. 3 is a block diagram that illustrates a payment system 300 provided according to aspects of the present disclosure. Although payment systems 200 and 300 are shown separately in FIGS. 2 and 3, nevertheless, in a practical embodiment, the systems 200 and 300 may simply be different aspects of a common system that incorporates some or all of the functionality described herein with respect to both systems 200 and 300.

In the payment system 300 of FIG. 3, a conventional personal computer or laptop computer 302 is being operated by the user 103 to engage in an online shopping session. To do this, the PC/laptop 302 engages in data communications via the internet 304 with a merchant e-commerce server 306. Thus, a browser (not separately shown) running on the PC/laptop 302 allows the PC/laptop 302 to access an online shopping website hosted by the e-commerce server 306. The user 103 also has available a suitably programmed mobile device 202.

A display device 308 is part of or associated with PC/laptop 302. It is assumed, for purposes of FIG. 3, that the online shopping session has reached a checkout phase, and that the display device 308 is accordingly displaying a checkout page downloaded from the e-commerce server 306 to the PC/laptop 302 in accordance with aspects of the present disclosure. The checkout page displayed by the display device 308 includes a dynamic design element 310 generated by the e-commerce server 306 in accordance with aspects of the present disclosure. As indicated at 312, the mobile device 202 scans the dynamic design element 310 via a camera function that is part of the mobile device 202. In response to data obtained by the mobile device 202 by scanning the dynamic design element 310, a payment app (not separately shown in FIG. 3) running on the mobile device 202 may open a communication channel 314 with the e-commerce server 306. The communication channel 314 may be via a mobile telecommunication network (not shown).

As in FIGS. 1 and 2, the payment system 300 may also include an acquirer computer 108, a payment network 110 and an issuer computer 112.

Both the illustrations in FIGS. 2 and 3 only show system components required for a single transaction. As noted in connection with FIG. 1, in practical embodiments of the system(s) 200, 300, there may be a considerable number of acquirers and issuers, as well as numerous merchants and many users operating mobile devices/PCs/laptops. Moreover, other functionality provided by system(s) 200, 300 may accommodate conventional POS and/or online shopping transactions.

Figure 4:
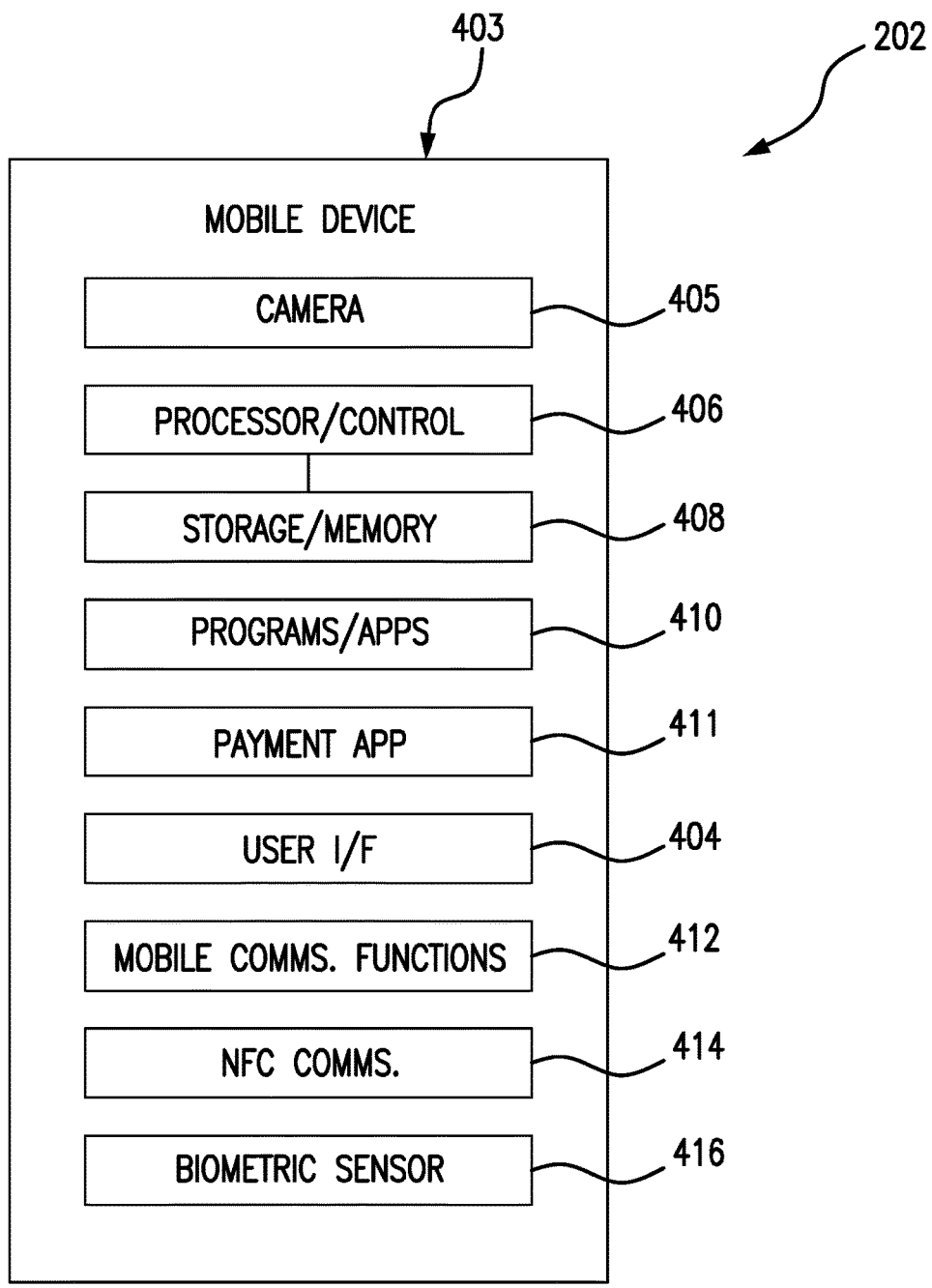
FIG. 4 is a simplified block diagram illustration of a mobile device that may be used in the payment system of FIG. 2 or 3.

FIG. 4 is a simplified block diagram illustration of the mobile device 202 shown in FIGS. 2 and 3.

The mobile device 202 may include a housing 403. In many embodiments, the front of the housing 403 is predominantly constituted by a touchscreen (not separately shown), which is a key element of the user interface 404 of the mobile device 202.

Further, as is quite typical of smartphones or other mobile devices, the mobile device 202 includes a digital camera component (block 405) contained in/supported on the housing 403. The digital camera component 405, as is also now typical, includes functionality that captures and stores digital moving images.

The mobile device 202 further includes a mobile processor/control circuit 406, which is contained within the housing 403. Also included in the mobile device 202 is a storage/memory device or devices (reference numeral 408). The storage/memory devices 408 are in communication with the processor/control circuit 406 and may contain program instructions to control the processor/control circuit 406 to manage and perform various functions of the mobile device 202. The processor 406 may be in communication with the digital camera component 405. As is well-known, a device such as mobile device 202 may function as what is in effect a pocket-sized personal computer (assuming for example that the mobile device is a smartphone), via programming with a number of application programs, or "apps", as well as a mobile operating system (OS). (The apps are represented at block 410 in FIG. 4, and may, along with other programs, in practice be stored in block 408, to program the processor/control circuit 406.)

Also shown in FIG. 4 is a payment app 411. The payment app 411 is shown apart from the other apps represented at block 410, in part due to the particular relevance of the payment app 411 to the subject of this disclosure. In addition, the separate representation of the payment app 411 also may be considered to represent the possibility that it is stored in a secure element (SE—not shown apart from block 411 or block 408), which may be provided in some embodiments of the payment-enabled mobile device 202 to provide enhanced security for the payment app 411 and/or sensitive data associated therewith. The SE, if present, may be conventional in its hardware aspects. In addition or alternatively, security for the payment app 411 may be enhanced by known alternatives to an SE, such as a TEE (trusted execution environment).

To the extent that the SE includes processing capabilities, it may functionally (though likely not physically) overlap with block 406; to the extent that the SE includes storage (and particularly program storage) capabilities, it may functionally (though likely not physically) overlap with block 408.

In some embodiments, the payment app 411 may in many respects resemble a conventional payment app that permits the mobile device 202 to engage in contactless payment transactions at a point of sale. In addition, however, the payment app 411 may be programmed to provide functionality as described herein.

As is typical for mobile devices, the mobile device 202 may include mobile communications functions as represented by block 412. The mobile communications functions may include voice and data communications via a mobile communication network (not shown) with which the mobile device 202 is registered.

In addition, to facilitate use as a payment-enabled device at a point of sale, the mobile device 202 may include short-range radio communications capabilities (block 414), including for example NFC (near field communication). Thus block 414 may represent a suitable antenna (not separately shown) that is appropriate for NFC communications as well as driving and receiving circuitry associated with the antenna. It will be appreciated that the NFC antenna may be separate and different from the antenna (not separately shown) utilized by the mobile device 202 for the mobile communication functions represented by block 412.

Also shown in FIG. 4 is a biometric sensor 416, which may be one of the components of the payment-enabled mobile device 202. The biometric sensor 416 may be, for example, a fingerprint sensor, and may operate to assist in verifying the user of the device in connection with payment transactions.

From the foregoing discussion, it will be appreciated that the blocks depicted in FIG. 4 as components of the mobile device 202 may in effect overlap with each other, and/or there may be functional connections among the blocks which are not explicitly shown in the drawing. It may also be assumed that, like a typical smartphone, the mobile device 202 may include a rechargeable battery (not shown) that is contained within the housing 403 and that provides electrical power to the active components of the mobile device 202.

It has been posited that the mobile device 202 may be embodied as a smartphone, but this assumption is not intended to be limiting, as mobile device 202 may alternatively, in at least some cases, be constituted by a tablet computer, a smartwatch or by other types of portable electronic devices.

Figure 5:
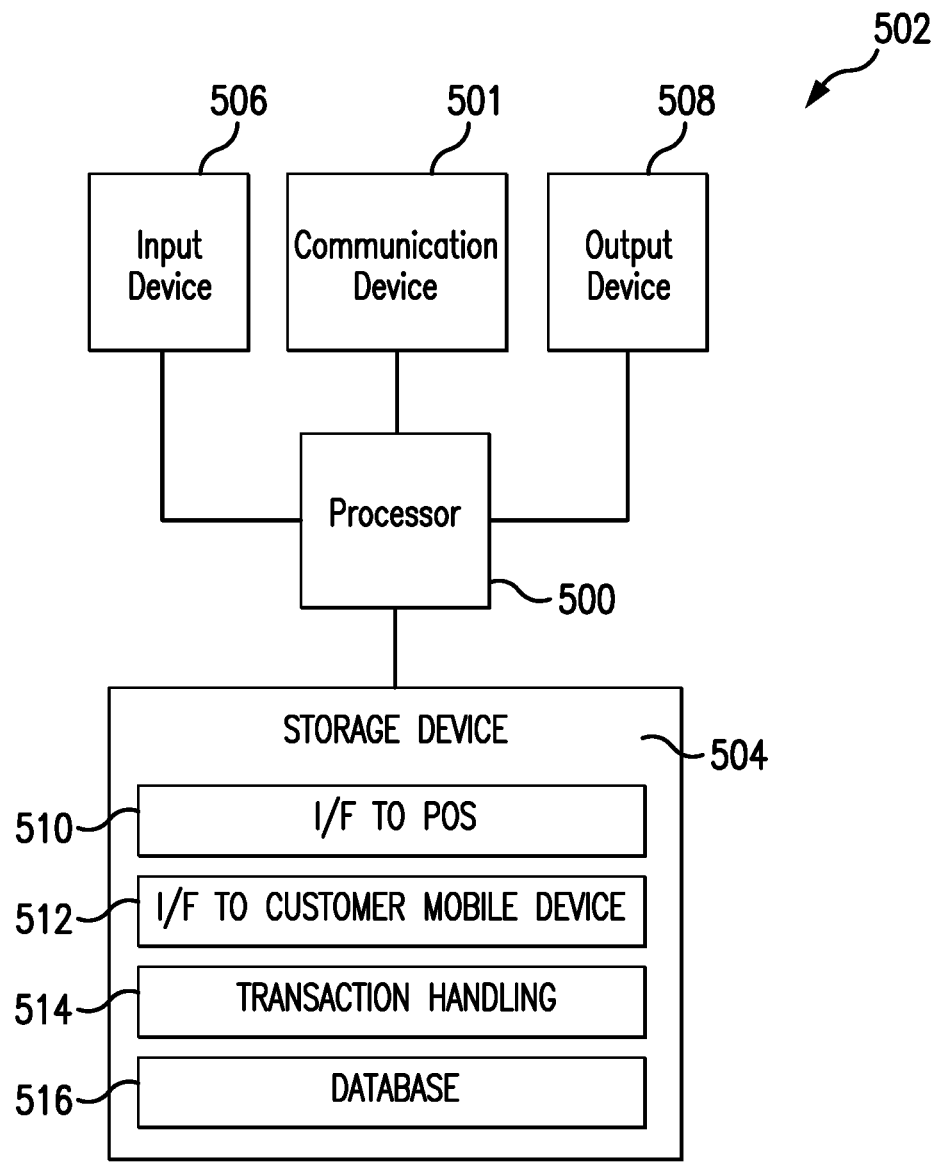
FIG. 5 is a block diagram that illustrates a computer system that may be a component of the payment system of FIG. 2 or 3.

FIG. 5 is a block diagram that illustrates an example embodiment of the merchant device 212 shown in FIG. 2. In some embodiments, the merchant device may take the form of a server computer; accordingly, for purposes of discussing this drawing, the apparatus depicted therein will be referred to as a "merchant computer." The merchant computer is generally indicated by reference numeral 502.

Referring now to FIG. 5, the merchant computer 502 may, in its hardware aspects, resemble a typical server computer, but may be controlled by software to cause it to function as described herein.

The merchant computer 502 may include a computer processor 500 operatively coupled to a communication device 501, a storage device 504, an input device 506 and an output device 508. The communications device 501, the storage device 504, the input device 506 and the output device 508 may all be in communication with the processor 500.

The computer processor 500 may be constituted by one or more processors. Processor 500 operates to execute processor-executable steps, contained in program instructions described below, so as to control the merchant computer 502 to provide desired functionality.

Communication device 501 may be used to facilitate communication with, for example, other devices (such as customers' mobile devices; POS devices). Communication device 501 may comprise numerous communication ports (not separately shown), to allow the merchant computer 502 to communicate simultaneously with a number of other devices, including communications as required to simultaneously handle numerous interactions with other devices referred to in connection with FIG. 2.

Input device 506 may comprise one or more of any type of peripheral device typically used to input data into a computer. For example, the input device 506 may include a keyboard and a mouse. Output device 508 may comprise, for example, a display and/or a printer.

Storage device 504 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 504 stores one or more programs for controlling processor 500. The programs comprise program instructions (which may be referred to as computer readable program code means) that contain processor-executable process steps of the merchant computer 502, executed by the processor 500 to cause the merchant computer 502 to function as described herein.

The programs may include one or more conventional operating systems (not shown) that control the processor 500 so as to manage and coordinate activities and sharing of resources in the merchant computer 502, and to serve as a host for application programs (described below) that run on the merchant computer 502.

The programs stored in the storage device 504 may include, for example, a software interface 510 that facilitates communication with the POS device 204 (FIG. 2) and/or other POS devices (not shown) operated by the merchant.

In addition, the storage device 504 may store a software interface 512 that facilitates communication with the mobile device 202 operated by the user 103 and/or other customers' mobile devices.

Still further, the storage device 504 may store a transaction handling application program 514. The transaction handling application program 514 may control the processor 500 so as to enable the merchant computer 502 to engage in transaction handling pursuant to requests from customers' mobile device (e.g., mobile device 202) and in accordance with aspects of the present disclosure. Details of the operation of the merchant computer 502 pursuant to the transaction handling application program 514 will be described below.

The storage device 504 may also store, and the merchant computer 502 may also execute, other programs, which are not shown. For example, such programs may include a reporting application, which may respond to requests from system administrators for reports on the activities performed by the merchant computer 502. The other programs may also include, e.g., device drivers, database management programs, communications software, etc.

The storage device 504 may also store one or more databases (reference numeral 516) required for operation of the merchant computer 502.

It should be noted that the e-commerce server 306 shown in FIG. 3 may be similar in its hardware architecture and components to the merchant computer 502 depicted in FIG. 5. Moreover, the e-commerce server 306 may engage in handling of transaction requests from customers' mobile devices (e.g., mobile device 202) in a fashion that may resemble transaction handling by the merchant computer 502. Still further, the e-commerce server may perform website hosting and other functionality associated with a typical e-commerce server.

Figure 6:
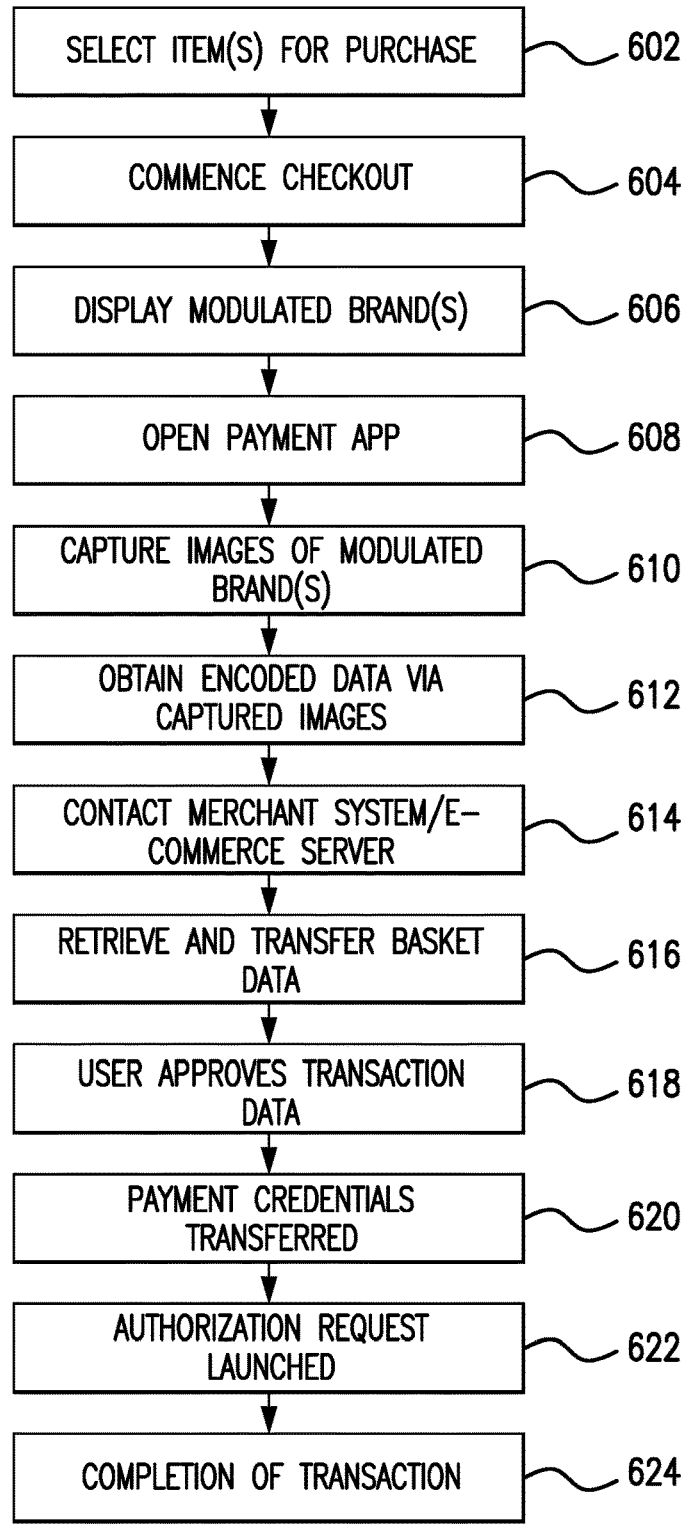
FIG. 6 is a flow chart that illustrates a process that may be performed according to aspects of the present disclosure in the payment system of FIG. 2 or 3.

FIG. 6 is a flow chart that illustrates a process that may be performed according to aspects of the present disclosure in the payment system(s) of FIGS. 2 and/or 3.

At 602, the customer/user selects one or more items to be purchased. In a "bricks and mortar" retail store environment, the user may pick one or more items from a shelf or shelves in the store and place the items in a physical shopping cart or basket. Alternatively, in an online shopping session, the user may interact with the merchant's online shopping website to view products and to designate one or more products for inclusion in a virtual shopping cart or basket.

At 604, the customer/user commences the checkout process. In the retail store environment, this may involve bringing the shopping basket/cart to a checkout counter and allowing a sales associate to scan barcodes on the selected items to input the product identifiers into a POS device (reference numeral 204, FIG. 2). In an online shopping session, the user may merely actuate a virtual button on a shopping webpage downloaded to the user's PC/laptop (reference numeral 302, FIG. 3) to indicate that the user has selected all items desired at the present time and is ready to proceed to checkout. The e-commerce server 306 then initiates a checkout phase of the online shopping session.

Figure 7:
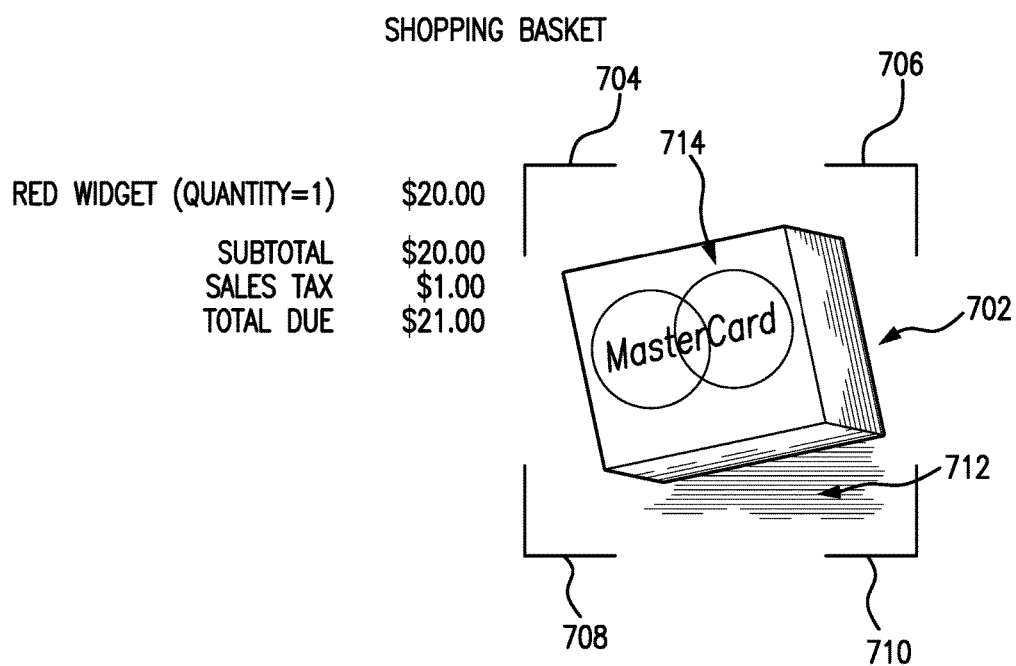
FIGS. 7-9 show example screen displays that may be provided in the payment system of FIG. 3 in accordance with aspects of the present disclosure.
Figure 8:
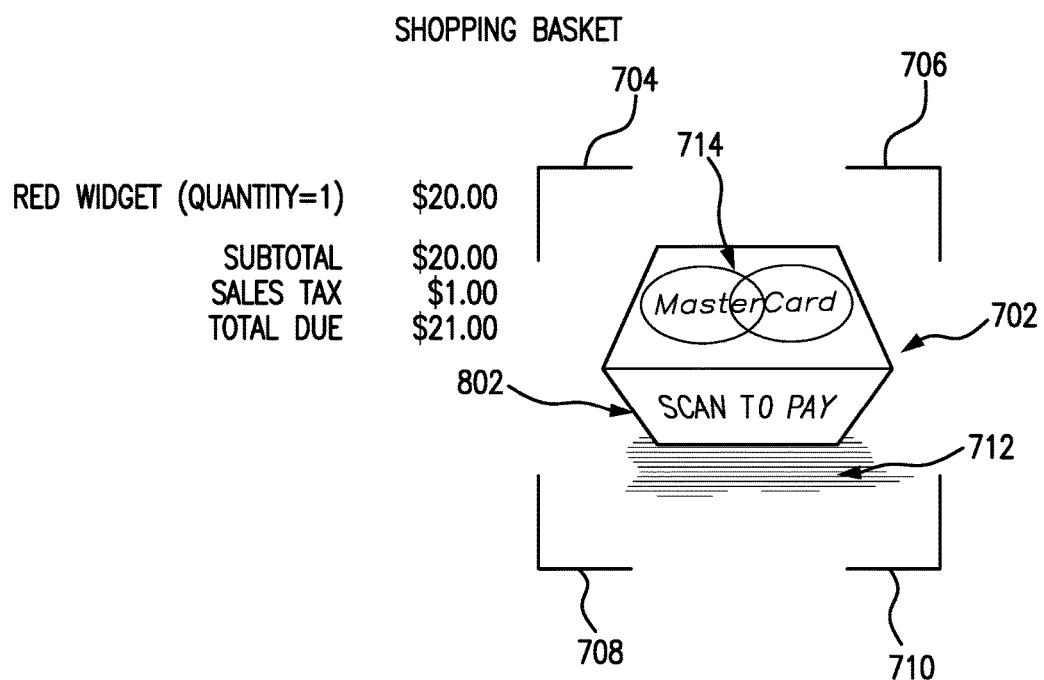

Continuing to refer to FIG. 6, at 606 a design element/branding element in a display image is presented to the user such that the design element is modulated over time to encode certain data to facilitate completion of the purchase transaction. Because the design element/branding element is modulated over time, it varies over time (though perhaps not in any manner that is perceptible to the human eye); accordingly the design element/branding element may be referred to as dynamic. The design/branding element may also be dynamic in the sense that it exhibits animation features or the like that are visible/attractive to the user, with the visible dynamic effects not necessarily directly involved in presenting coded information. FIGS. 7 and 8 are simplified example display images that may be downloaded from the e-commerce server 306 to the PC/laptop 302 as part of the checkout process and in accordance with aspects of the present disclosure.

In the particular example display images of FIGS. 7 and 8, a design/branding element in the form of an animated/dynamic "cube" visual element 702 (hereinafter, the "dynamic cube") is featured. The dynamic cube may spin, wobble, appear to increase or decrease in size (i.e., appear to move closer to or further away from the viewer) and/or change position within a virtual frame defined by four corner image elements 704, 706, 708, 710. Simulated shading and lighting effects and so forth may be applied to the dynamic cube 702 and/or its faces. In one effect that can be clearly seen in FIGS. 7 and 8, a shadow 712 is presented as being cast by the dynamic cube 702. As the dynamic cube 702, moves, changes size, etc., the shadow 712 may also move, and change size and shape in the display (and within the virtual frame 704, 706, 708, 710) to enhance the simulation of realism that enhances the appearance and attractiveness of the dynamic cube 702.

A number of faces of the dynamic cube 702 may each display the brand/logo of a respective payment account network. For example, one face, as indicated at 714, may "wear" the famous logo of Mastercard International Incorporated, which is the assignee hereof. Other faces of the dynamic cube 702, which are not visible in the drawing, may respectively bear the logos of other payment networks, such as, for example, Visa, Discover, American Express, etc.

In addition, one face (best seen at 802 in FIG. 8) may show the words "SCAN TO PAY". This may serve as a cue to the user that the dynamic cube 702 has a functional aspect (as described herein) as well as being visually appealing and attracting the user's attention. It is to be understood that with the apparent motion and rotation of the dynamic cube 702, possibly at a rapid pace, each of its faces may be presented to the user within a short time to convey the payment network brands available and to indicate the utility of the dynamic cube 702 as an encoded display element.

The optically-scannable encoding associated with the dynamic cube 702 may be implemented in a number of different ways. Preferably, the encoding features involve modulation over time in a manner that is not visible or noticeable to the human eye, such that the esthetic appearance of the dynamic cube 702 (and/or its shadow 712) is not adversely affected. For example, in some embodiments, one or a number of selected locations (perhaps only a few pixels in diameter/size) may be "pulsed" to represent encoded information, with the pulsing exhibited (subject to image analysis but preferably below the threshold of human optical perception) in terms of one or more changes in color, tone, brightness, position, speed and/or direction of movement, contrast, and/or intensity, etc. In addition or alternatively, the modulation may affect the shading/lighting effects applied to the currently visible faces of the dynamic cube 702 and/or the size, shape and/or position of the shadow 712.

In some embodiments, instead of modulating/encoding a dynamic display element, an apparently static display element (e.g., a brand logo) may be modulated in one or more of the manners described above to represent encoded information to be obtained by scanning the display element. In some embodiments, modulation of the dynamic cube 702, and encoding of information, may be accomplished by moving one or more portions of the dynamic cube 702 or the entire dynamic cube 702 or its shadow 712 relative to the frame 704, 706, 708, 710. (Thus, the frame 704, 706, 708, 710 may serve as a reference element for the image processing that is discussed below.) In some embodiments, a design element or other portion of a display page that is not a brand or brand logo may be modulated to encode information for the purposes described herein. In some embodiments, an animated/dynamic design element other than a cube may be employed for modulation to represent encoded information. For example, an animation that portrays assembling of a brand logo from suitably colored (visual) bits may be modulated to represent data in addition to providing the aesthetically pleasing effect of the animation.

Returning to the display images depicted in FIGS. 7 and 8, it will be noted that other elements are included, intended to represent typical information that may be present in the checkout display page in an online shopping session. Those who are skilled in the art will recognize that additional and/or different information or elements (including, e.g., the merchant's name and/or logo) may also be included. For purposes of illustration, the dynamic cube and the frame are presented as rather large in size relative to other elements of the image. In alternative embodiments, the actual size of the dynamic cube and frame may be smaller so as not to throw the overall layout of the display image out of balance.

It was noted above that the display images depicted in FIGS. 7 and 8 may be generated as checkout page images by the e-commerce server 306 which appears in FIG. 3. In the case of the embodiment of FIG. 2, a suitable transaction status/checkout display image may be presented on the display device 206 of the POS device 204 (i.e., generated by the POS device 204) and may include display elements like the dynamic cube, shadow and frame of FIGS. 7 and 8 and/or other display elements that may be modulated over time to encode information for purposes described herein.

Referring again to FIG. 6, at 608, the user 103 may operate the mobile device 202 (FIGS. 2, 3) to open the payment application 411 (FIG. 4). In some embodiments, the opening of the payment application 411 may be accomplished by the user 103 presenting his/her fingertip to a fingerprint scanner (biometric sensor 416, FIG. 4), such that user authentication along with opening of the payment application 411 are accomplished with a single action. Alternatively, the payment application may be opened by selecting a virtual button suitably displayed on the mobile device user interface and user authentication may then proceed biometrically and/or by PIN entry and verification, etc.

Continuing to refer to FIG. 6, at 610, the user 103 may operate the mobile device 202 to scan the dynamic cube 702 or other designated design/brand/image element to launch the next stage of the payment process. The user 103 may be prompted to do so by, for example, the mobile device 202 displaying a message such as "Scan the cube to pay." The prompt may be issued by the mobile device 202 under the control of the payment application 411. In the scanning process step, the camera component 405 (FIG. 4) of the mobile device 202 may be positioned relative to the designated image element (item 208 in FIG. 2 or 310 in FIG. 3) on the display device 206 (FIG. 2) or display device 308 (FIG. 3), as the case may be, so that the camera component 405 may capture a sequence of images of the image element 208 or 310. The scanning of the designated image element 208 or 310 (e.g., the dynamic cube, etc.) may involve obtaining moving images of the designated image element 208 or 310 to capture the modulation over time of the designated image element.

Referring still to FIG. 6, at 612, the mobile device 202, via the payment application 411, may analyze the moving images captured at 610 to detect the encoded information represented by the modulation of the designated image element 208 or 310. The encoded information may include, for example, an address (e.g. a web address) for the merchant system 218 (FIG. 2) or for the mobile device interface of the e-commerce server 306 (as the case may be). The encoded information may also include a "basket number" that points to transaction data for the current transaction that has been stored in the merchant system 218 or the e-commerce server 306. In some embodiments, as an alternative or supplement to the basket number, the modulated design element may also encode, and the payment application 411 may also detect, transaction data, such as total transaction amount, merchant identifier, etc.

Still referring to FIG. 6, at 614, the mobile device 202 (under control by the payment application 411) may use the merchant address information to contact the e-commerce server 306 or the merchant device 212 so as to establish a channel of communication with the e-commerce server 306 or the merchant device 212. Once the channel of communication is established, the mobile device 202/payment application 411 may transmit the basket number to the e-commerce server 306 or the merchant device 212.

At 616 in FIG. 6, the e-commerce server 306 or the merchant device 212 may use the basket number to retrieve the relevant transaction data, and then may transmit the transaction data to the mobile device 202. At 618, the mobile device 202/payment application 401 may display the transaction data and prompt the user 103 to indicate whether he or she approves the transaction. The user 103 may indicate approval by suitable interaction with the mobile device user interface. (In some embodiments, the user authentication—e.g., biometrically—may occur at this stage rather than in conjunction with opening the payment app, as referred to above in connection with step 608.)

At 620, in response to the user's approval of the transaction, the mobile device 202/payment application 411 may transmit the user's payment credentials to the merchant device 212 or the e-commerce server 306 (as the case may be) or may cause the payment credentials to be transmitted to the merchant device 212 or the e-commerce server 306. As will be understood by those who are skilled in the art, the payment credentials may include a payment account number or a token that points to the user's payment account, as well as related information.

Using the payment credentials provided by the mobile device 202, the e-commerce server 306 (or the merchant device 212) may initiate an essentially conventional payment account transaction authorization request (block 622, FIG. 6), of the kind referred to above in connection with FIG. 1. The payment account transaction may then be completed in a conventional manner, as indicated by block 624 in FIG. 6.

The modulated design/brand element, encoded with information to launch a mobile device payment transaction, may be a more esthetically appealing alternative to the QR codes mentioned in the '974 and '968 applications referred to above and incorporated herein. The modulated design/brand element may function or launch functionality in any of the manners described in the '974 and '968 applications. One aspect of the aesthetic appeal of the design/brand element illustrated herein may be that, unlike QR codes, the encoding of the transaction-launching data in the design/brand element may not be perceptible to human optical perception and thus may allow for maximum attractiveness of the display presented to the user.

It is within the contemplation of this disclosure that encoding techniques like those described above or other encoding techniques may be employed. Among the encoding techniques that may be employed is steganography in the spatial and/or frequency domain or adaptive steganography (which operates in both the spatial and frequency domains). Watermarking is another encoding technique that may be employed. The watermarking may use an LSB (least significant bit) method or a thresholding approach, or may be carried out in the frequency domain using transforms such as the Fast Fourier Transform (FFT) or the Discrete Cosine Transform (DCT).

Machine vision techniques may also be employed to recognize encoded features of the brand/design element. One or more machine vision techniques such as color or "blob" detection, feature or shape detection, template matching and motion detection may be employed. Furthermore, pattern recognition techniques may also be used for the same purpose. Still another technique that may be used is motion tracking to recognize hidden moving features that bear the encoded data in the brand/design element. Still another technique that may be employed is color change tracking.

It is further contemplated that animation recognition may be employed, such that the animated brand/design element is uniquely generated (but not perceptibly differently generated) for each user. For detection purposes a hash may be calculated over the captured animation to identify the user and launch the transaction.

Figure 9:
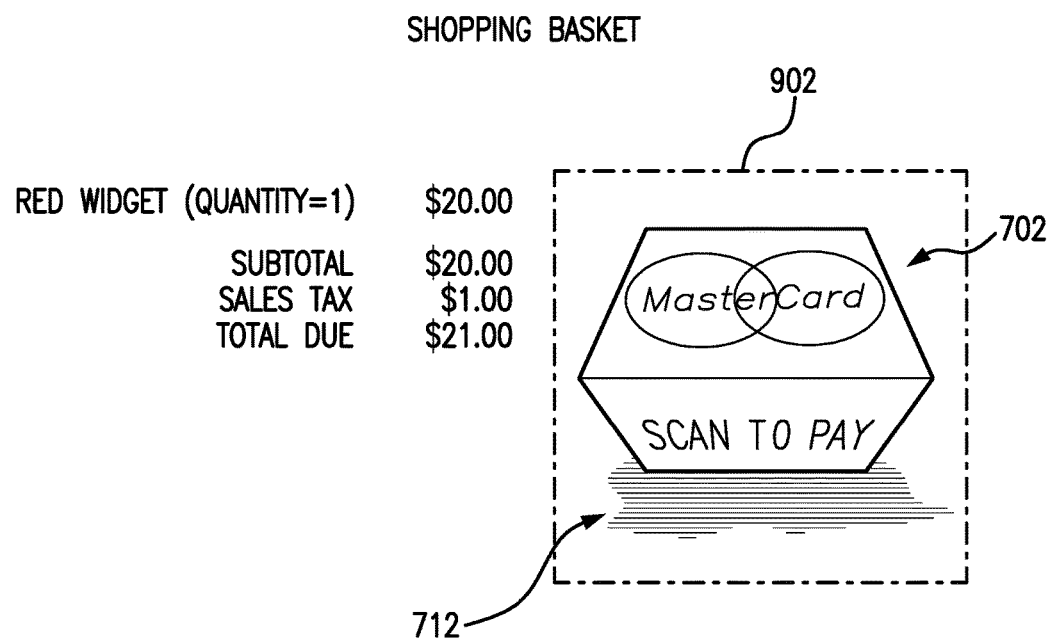

In embodiments described above, all the information obtained by the mobile device 202 by scanning the displayed image was encoded information represented by modulation of a dynamic or (apparently) static design element. Alternatively, however, and in addition to obtaining some information from encoded-by-modulation detected data, the mobile device 202/payment application 411 may also obtain information from other aspects of the display image. For example, the mobile device may perform optical character recognition (OCR processing) on portions of the display image to obtain information (e.g., transaction information) therefrom. In addition or alternatively, the mobile device 202/payment application 411 may scan a static encoded display element. One such possible element is represented by the dot-dash frame 902 shown in FIG. 9 (which is another example display image that may be displayed at 606 in FIG. 6). For simplicity of illustration, the dots and dashes in frame 902 are in a uniform sequence, and thus would not be suitable themselves for encoding information statically. However, in a practical embodiment of the frame 902, the dots and dashes may be in a sequence that varies along the frame, thereby potentially encoding information. It should also be noted that the resolution of the dots and dashes may be much higher (i.e., the dots and dashes may be much smaller in length) in a practical embodiment of the frame 902, so that a relatively large amount of data may be encoded therein. (In addition to serving as a static encoded element, the frame 902 may also serve as a reference element relative to the dynamic cube 702, etc. and/or portions of the frame 902 may be modulated over time to provide dynamic encoding of data.) Other possible types of static encoded display elements may include conventional or other barcode types.

Although embodiments referred to above have been described in the context of a payment card account system in which credit card account transactions, debit card account transactions and other typical payment card account system transactions are performed, the teachings of this disclosure are not limited to such transactions. In other embodiments, the teachings of the present disclosure may also be applied to payment transactions that utilize an ACH (automated clearing house) system and/or to transfers of value that utilize blockchain technology.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific example embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
using a camera component of a mobile device to capture images over time of a design element displayed on a display screen, the design element modulated over time to encode data in the design element, the design element presented by a merchant;
analyzing the captured images by a payment application running on the mobile device to obtain the encoded data;
the payment application using the encoded data to establish a communication channel with a merchant device, the merchant device operated by or on behalf of the merchant; and
the payment application engaging in a purchase transaction with the merchant device via the communication channel, the purchase transaction including the payment application causing payment credentials to be transmitted to the merchant device to permit the merchant device to use the payment credentials to initiate a request for payment;
wherein the design element is presented by the merchant via being included in a web page downloaded by the merchant to a computer operated by a user of the mobile device.

2. The method of claim 1, wherein the design element is modulated by being moved relative to a reference display element.

3. The method of claim 1, further comprising:
using the camera component to read transaction information from the display screen via optical character recognition (OCR).

4. The method of 1, wherein the design element includes an animated cube.

5. A method comprising:
using a camera component of a mobile device to capture images over time of a design element displayed on a display screen, the design element modulated over time to encode data in the design element, the design element presented by a merchant;
analyzing the captured images by a payment application running on the mobile device to obtain the encoded data;
the payment application using the encoded data to establish a communication channel with a merchant device, the merchant device operated by or on behalf of the merchant; and the payment application engaging in a purchase transaction with the merchant device via the communication channel, the purchase transaction including the payment application causing payment credentials to be transmitted to the merchant device to permit the merchant device to use the payment credentials to initiate a request for payment;

wherein the encoded data is communicated by pulsing at least one selected location on the design element.

6. The method of claim 5, wherein the pulsing is not perceptible to human optical perception.

7. The method of claim 5, wherein:
the mobile device is present at a retail store operated by the merchant; and
the design element is displayed by a point-of-sale terminal at the retail store.

8. A method comprising:
displaying a design element on a display screen, the design element including encoded data in a manner that is not perceptible to human optical perception, the design element presented by a merchant;
using a camera component of the mobile device to capture images over time of a design element displayed on a display screen, the design element including encoded data in a manner that is not perceptible to human optical perception, the design element presented by a merchant;
analyzing the captured images by a payment application running on the mobile device to obtain the encoded data;
the payment application using the encoded data to establish a communication channel with a merchant device, the merchant device operated by or on behalf of the merchant; and
the payment application engaging in a purchase transaction with the merchant device via the communication channel, the purchase transaction including the payment application causing payment credentials to be transmitted to the merchant device to permit the merchant device to use the payment credentials to initiate a request for payment;
wherein the design element is presented by the merchant via being included in a web page downloaded by the merchant to a computer operated by a user of the mobile device.

9. The method of claim 8, further comprising:
using the camera component to read transaction information from the display screen via optical character recognition (OCR).

10. The method of claim 8, wherein the design element includes an animated cube.

11. A mobile device comprising:
a processor;
a digital camera in communication with the processor; and
a memory in communication with the processor, the memory storing program instructions, the processor operative with the program instructions to perform functions as follows:
capture images over time, via the digital camera, of a design element displayed on a display screen, the design element modulated over time to encode data in the design element, the design element presented by a merchant;
analyzing the captured images by a payment application executed by the processor to obtain the encoded data;
the payment application using the encoded data to establish a communication channel with a merchant device, the merchant device operated by or on behalf of the merchant; and
the payment application engaging in a purchase transaction with the merchant device via the communication channel, the purchase transaction including the payment application causing payment credentials to be transmitted to the merchant device to permit the merchant device to use the payment credentials to initiate a request for payment;
wherein the design element is presented by the merchant via being included in a web page downloaded by the merchant to a computer operated by a user of the mobile device.

12. The mobile device of claim 11, wherein the design element is modulated by being moved relative to a reference display element.

13. The mobile device of claim 11, wherein the processor is further operative with the program instructions to use the camera component to read transaction information from the display screen via optical character recognition (OCR).

14. A mobile device comprising:
a processor;
a digital camera in communication with the processor; and
a memory in communication with the processor, the memory storing program instructions, the processor operative with the program instructions to perform functions as follows:
capture images over time, via the digital camera, of a design element displayed on a display screen, the design element modulated over time to encode data in the design element, the design element presented by a merchant;
analyzing the captured images by a payment application executed by the processor to obtain the encoded data;
the payment application using the encoded data to establish a communication channel with a merchant device, the merchant device operated by or on behalf of the merchant; and
the payment application engaging in a purchase transaction with the merchant device via the communication channel, the purchase transaction including the payment application causing payment credentials to be transmitted to the merchant device to permit the merchant device to use the payment credentials to initiate a request for payment;
wherein the encoded data is communicated by pulsing at least one selected location on the design element.

15. The mobile device of claim 14, wherein the pulsing is not perceptible to human optical perception.

16. The mobile device of claim 14, wherein:
the mobile device is present at a retail store operated by the merchant; and
the design element is displayed by a point-of-sale terminal at the retail store.

* * * * *